United States Patent
Yamamoto et al.

(10) Patent No.: US 11,516,407 B2
(45) Date of Patent: Nov. 29, 2022

(54) VIBRATION DRIVING DEVICE AND IMAGE PICKUP APPARATUS USING THIS

(71) Applicant: CANON KABUSHIKI KAISHA, Tokyo (JP)

(72) Inventors: Yasufumi Yamamoto, Kanagawa (JP); Ayumu Nemoto, Tokyo (JP); Kaori Tomura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/444,769

(22) Filed: Aug. 10, 2021

(65) Prior Publication Data
US 2022/0070382 A1 Mar. 3, 2022

(30) Foreign Application Priority Data

Aug. 31, 2020 (JP) .............................. JP2020-145845
Aug. 31, 2020 (JP) .............................. JP2020-145846

(51) Int. Cl.
*H04N 5/232* (2006.01)
*H02N 2/00* (2006.01)
(Continued)

(52) U.S. Cl.
CPC ......... *H04N 5/23299* (2018.08); *H02N 2/001* (2013.01); *H04N 5/2253* (2013.01)

(58) Field of Classification Search
CPC .. H04N 5/23299; H04N 5/2253; H02N 2/001; H02N 2/0015; H02N 2/12;
(Continued)

(56) References Cited

U.S. PATENT DOCUMENTS

| 4,868,446 A * | 9/1989 | Kumada | H02N 2/002 310/369 |
| 2015/0171773 A1* | 6/2015 | Suefuji | H02N 2/163 310/323.16 |
| 2018/0323729 A1* | 11/2018 | Arakawa | H02N 2/0055 |

FOREIGN PATENT DOCUMENTS

| JP | 02-253210 A | 10/1990 |
| JP | 2004-304887 A | 10/2004 |

(Continued)

OTHER PUBLICATIONS

The above U.S. publications were cited in a British Search Report dated Dec. 23, 2021, a copy of which is enclosed, that issued in the corresponding British Patent Application No. 2110930.1.
(Continued)

*Primary Examiner* — Christopher K Peterson
(74) *Attorney, Agent, or Firm* — Cowan, Liebowitz & Latman, P.C.

(57) ABSTRACT

A vibration driving device that achieves low cost and high accuracy while reducing driving load. A drive unit has a vibrator with a projection and generates driving force by vibrating the vibrator. A first unit has a contact portion with which the projection is in pressure contact in a first direction. A second unit rotates relative to the first unit around a rotation axis parallel to the first direction by the driving force. Three or more support members are between the first and second units in the first direction to support the first and second units rotatably. The support members are positioned such that, during relative rotation of the first and second units, a contact point at which the projection contacts the contact portion is always located in at least one of triangular areas formed by connecting any three support members with straight lines when viewed in the first direction.

14 Claims, 12 Drawing Sheets

(51) Int. Cl.
    *H04N 5/225*     (2006.01)
    *H02N 2/12*     (2006.01)
    *H02N 2/10*     (2006.01)
    *G02B 7/02*     (2021.01)
    *G02B 7/04*     (2021.01)

(58) Field of Classification Search
    CPC .......... H02N 2/103; H02N 2/00; H02N 2/005; H02N 2/0055; G02B 7/02; G02B 7/04
    See application file for complete search history.

(56) References Cited

FOREIGN PATENT DOCUMENTS

| JP | 2006-158053 A | 6/2006 |
| JP | 2006-158054 A | 6/2006 |
| JP | 2010-122403 A | 6/2010 |
| JP | 2014-085470 A | 5/2014 |
| JP | 2018-189745 A | 11/2018 |
| JP | 2018-205494 A | 12/2018 |

OTHER PUBLICATIONS

The above foreign patent documents #1, #2 and #3 were cited in the Aug. 9, 2022 Japanese Office Action, which is enclosed without an English Translation, that issued in Japanese Patent Application No. 2020-145845.

The above foreign patent documents #3, #4 and #5 were cited in the Aug. 9, 2022 Japanese Office Action, which is enclosed without an English Translation, that issued in Japanese Patent Application No. 2020-145846.

\* cited by examiner

VIBRATION DRIVING DEVICE AND IMAGE PICKUP APPARATUS USING THIS

BACKGROUND OF THE INVENTION

Field of the Invention

The present invention relates to a vibration driving device that generates rotational driving force by vibration and frictional force, and an image pickup apparatus using this.

Description of the Related Art

Some conventional electronic apparatuses, such as image pickup apparatuses, employ a vibration driving device that generates rotational driving force by excited vibration and frictional force. A rotary ultrasonic motor that has characteristics of compact size, high output, and silence is known as a vibration driving device. Japanese Laid-Open Patent Publication (Kokai) No. 2018-189745 (JP 2018-189745A) discloses an ultrasonic motor that employs a ring type vibrator. Japanese Laid-Open Patent Publication (Kokai) No. 2006-158054 (JP 2006-158054A) and Japanese Laid-Open Patent Publication (Kokai) No. 2004-304887 (JP 2004-304887A) disclose ultrasonic motors that employ a vibrating reed type vibrator. When an ultrasonic motor is used for a lens drive of a camera, for example, a vibrator is in pressure contact with a friction member connected with a lens frame. And the lens frame is rotationally driven by transferring elliptic movement that the vibrator generates to the friction member.

Incidentally, since a drive unit of a vibration driving device drives a driven unit while always receiving pressure force, a loss of driving force due to sliding friction resulting from the pressure force occurs. Accordingly, in order to reduce such a loss of the driving force due to the sliding friction, JP 2018-189745A and JP 2006-158054A disclose configurations that receive the pressure force by rolling members like balls.

However, the slide friction that generates the loss of the driving force occurs also in a radial direction. For example, the configuration of JP 2018-189745A supports a rotation barrel pressurized in a thrust direction with rollers arranged in a circumferential direction and prevents shakiness during the rotational drive in the radial direction by fitting a projection formed on an end face in the thrust direction of the rotation barrel into the inner faces of the respective rollers. According to this configuration, since the sliding friction occurs in the fitting part in the radial direction of the rotation barrel, the loss of the driving force occurs also in this place. Furthermore, since the projection of the rotation barrel fits into the inner faces of the rollers at a position outer than a position where the vibrator is in pressure contact in the radial direction, the loss in the fitting part affects the loss of the driving force greatly. Accordingly, there is space for an improvement about reducing driving load.

Moreover, the configuration of JP 2006-158054A supports a rotation barrel pressurized in a thrust direction by nipping balls between V grooves provided along circumferences of a rotor body and bearing holder and prevents shakiness in the radial direction during rotational drive. Since this configuration supports the rotation barrel by rolling friction in both the thrust and radial directions, the loss of the driving force is reduced. However, extremely high processing accuracy is required for coincidence of the diameters of the V grooves and for elimination of decentering, which raises the cost. Accordingly, it is difficult to cope with both cost reduction and keeping of high processing accuracy.

Moreover, each of JP 2006-158054A and JP 2004-304887A suggests a vibration motor that is constituted so that a vibrator of relatively small size is in pressure contact with a ring-shaped friction member only in a specific position on the circumference of the friction member. Such a vibration motor is advantageous for miniaturization because the size of the vibrator is small.

However, since the friction member is regulated only in the specified position on the circumference, the friction member tends to generate unnecessary resonance resulting of few regulations, which may become a hindrance factor of the driving force of the vibrator and may lower drive performance as the vibration motor. In the meantime, the friction member may be fixed to a stationary member with screws in order to prevent unnecessary resonance of the friction member. However, if the friction member is fixed to the stationary member without any idea, there is a possibility of generating unnecessary resonance or causing enlargement of the entire unit.

SUMMARY OF THE INVENTION

The present invention provides a vibration driving device that achieves low cost and high accuracy while reducing driving load.

Accordingly, the present invention provides a vibration driving device including a drive unit having a vibrator provided with a projection and configured to generate driving force by vibrating the vibrator, a first unit having a contact portion with which the projection is in pressure contact in a first direction, a second unit configured to rotate relatively with respect to the first unit around a predetermined rotation axis that is parallel to the first direction by the driving force of the drive unit, and three or more support members between the first unit and the second unit in the first direction and configured to support the first unit and the second unit so as to be rotatable relatively. The support members are positioned such that, during relative rotation of the first unit and the second unit, a contact point at which the projection contacts the contact portion is always located in at least one triangular area of one or more triangular areas formed by connecting any three support members with straight lines among the three or more support members when viewed in the first direction.

According to the present invention, a vibration driving device that achieves low cost and high accuracy while reducing driving load can be provided.

Further features of the present invention will become apparent from the following description of exemplary embodiments with reference to the attached drawings.

DESCRIPTION OF THE EMBODIMENTS

Figure 1:
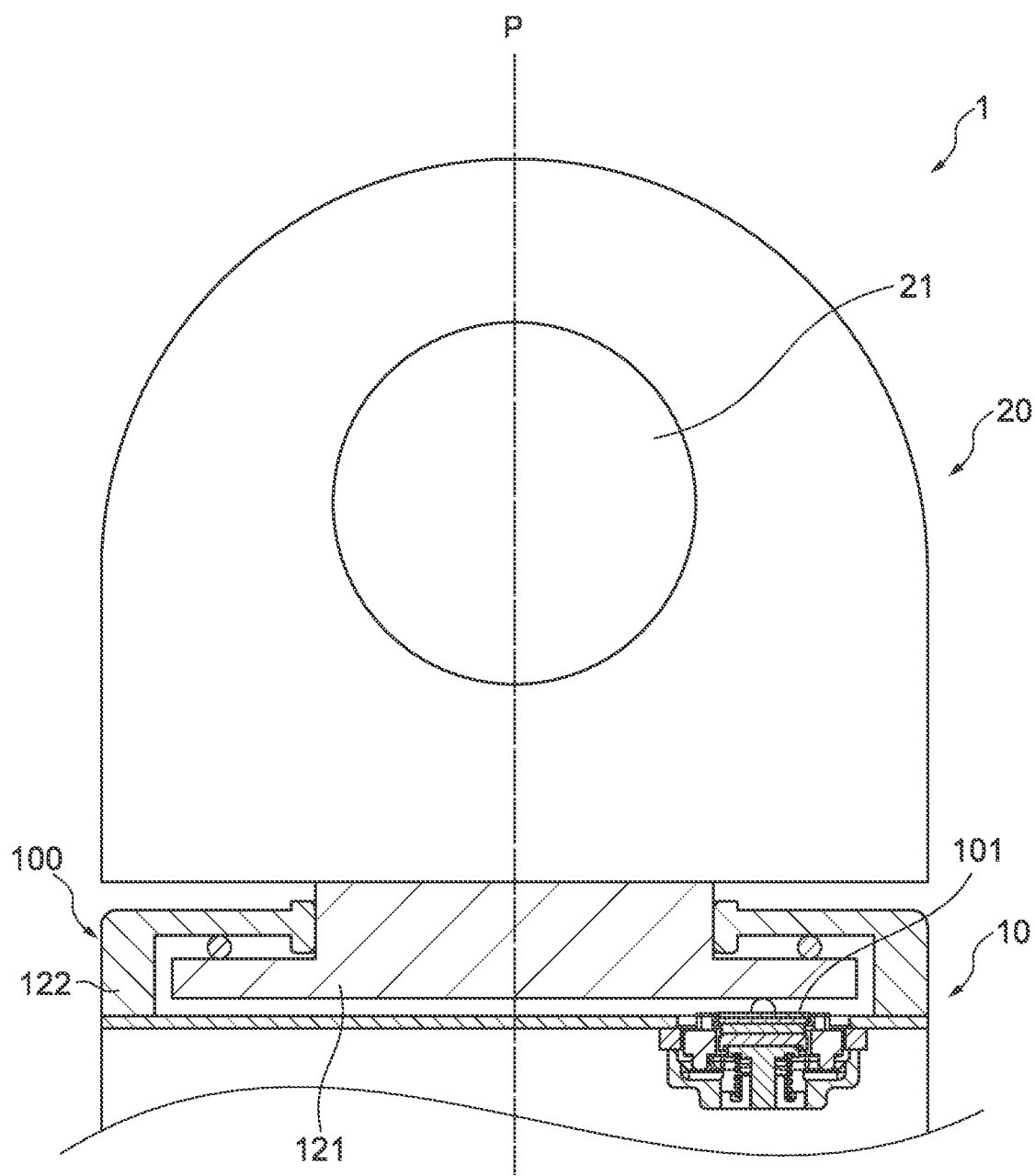
FIG. 1 is a schematic view showing an electronic apparatus to which a vibration motor as a vibration driving device according to a first embodiment of the present invention is applied.

Hereafter, embodiments according to the present invention will be described in detail by referring to the drawings.

FIG. 1 is a schematic view showing an electronic apparatus to which a vibration motor as a vibration driving device according to a first embodiment of the present invention is applied. A rotary drive device 1 is exemplified as this electronic apparatus. The rotary drive device 1 includes a fixed body 10 and a movable body 20 that rotates with respect to the fixed body 10. The fixed body 10 includes a control substrate (not shown) that controls the entire rotary drive device 1 besides the vibration motor 100 as the vibration driving device. The vibration motor 100 is shown by a sectional view. The movable body 20 includes an image pickup apparatus 21 that is an image pickup unit that can pick up an image of an object. It should be noted that the entire rotary drive device 1 may be called as the image pickup apparatus.

The vibration motor 100 is a rotary ultrasonic motor that is provided with a vibrator 101 (mentioned later) that rotationally drives the driven body 121 using vibration. The movable body 20 is connected with the driven body 121 of the vibration motor 100. When the vibrator 101 rotationally moves the driven body 121, the movable body 20 including the image pickup apparatus 21 rotates around a rotation axis P passing a rotation center. An image pickup direction of the image pickup apparatus 21 varies because the movable body 20 rotates.

The rotary drive device 1 is configured to be used in a state where the movable body 20 is connected with the driven body 121 and a support body 122 is fixed. On the contrary, the rotary drive device 1 may be configured to be used in a state where the movable body 20 is connected with the support body 122 and the driven body 121 is fixed.

Figure 2:
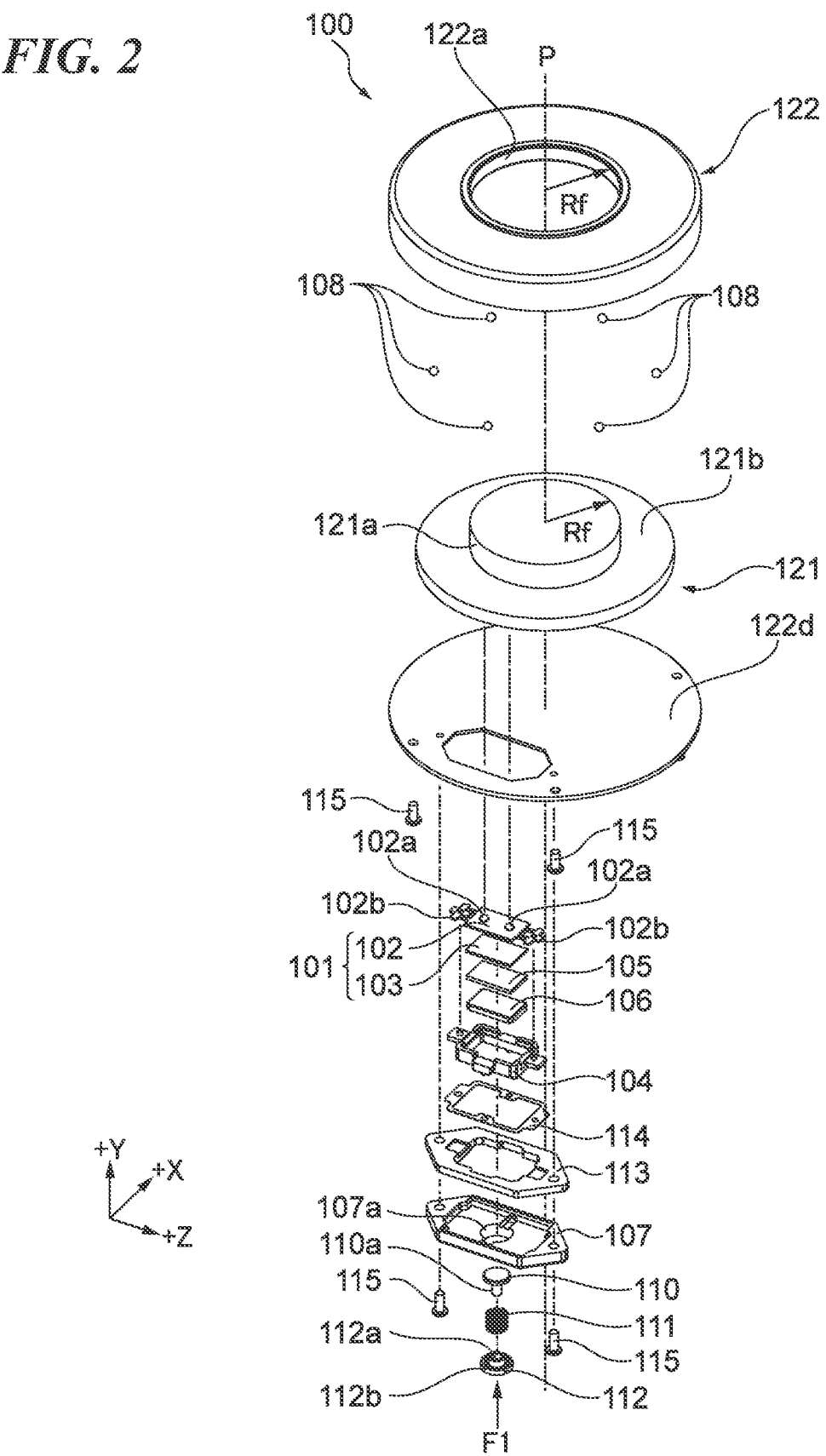
FIG. 2 is an exploded perspective view showing the vibration motor.
Figure 3:
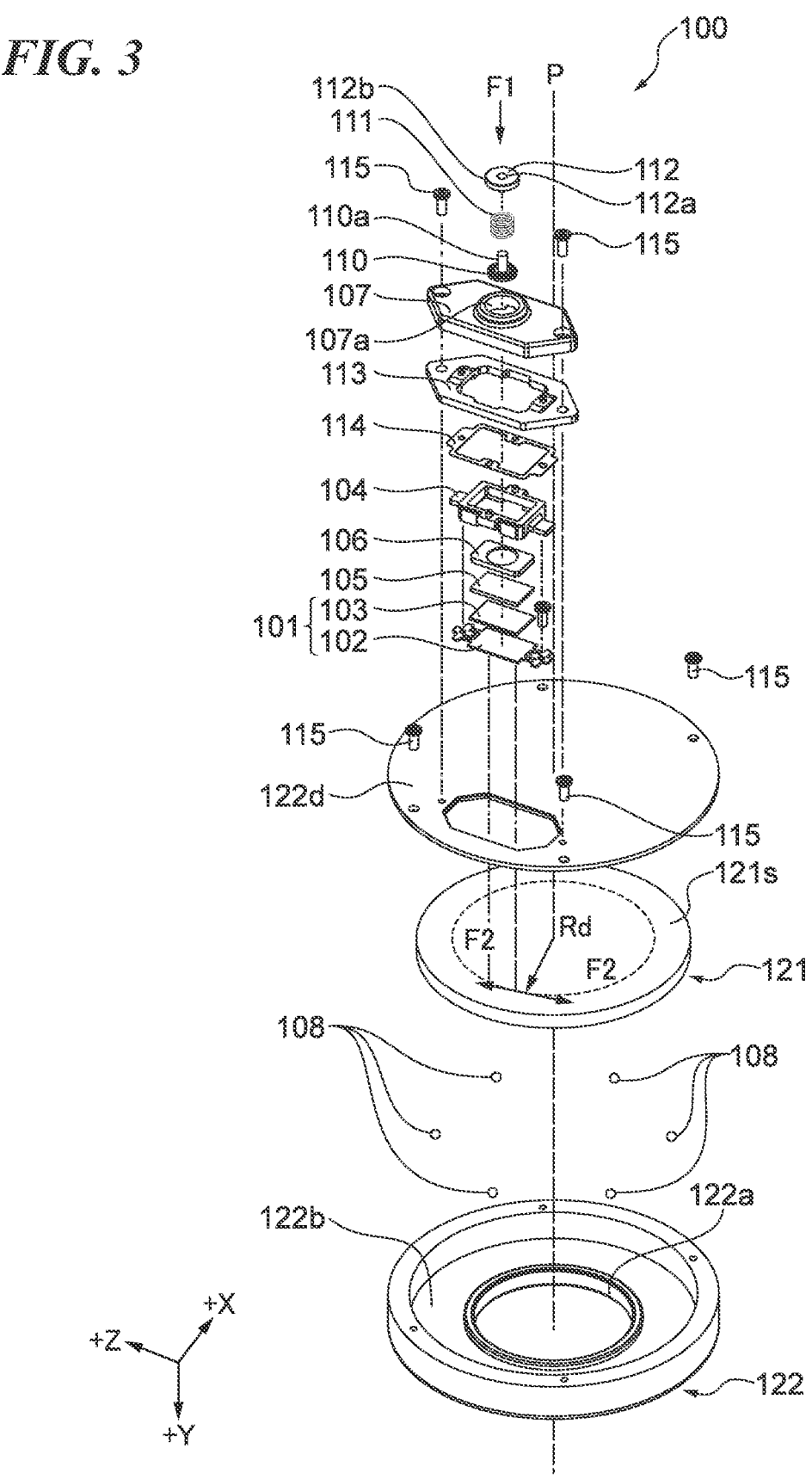
FIG. 3 is an exploded perspective view showing the vibration motor.
Figure 4:
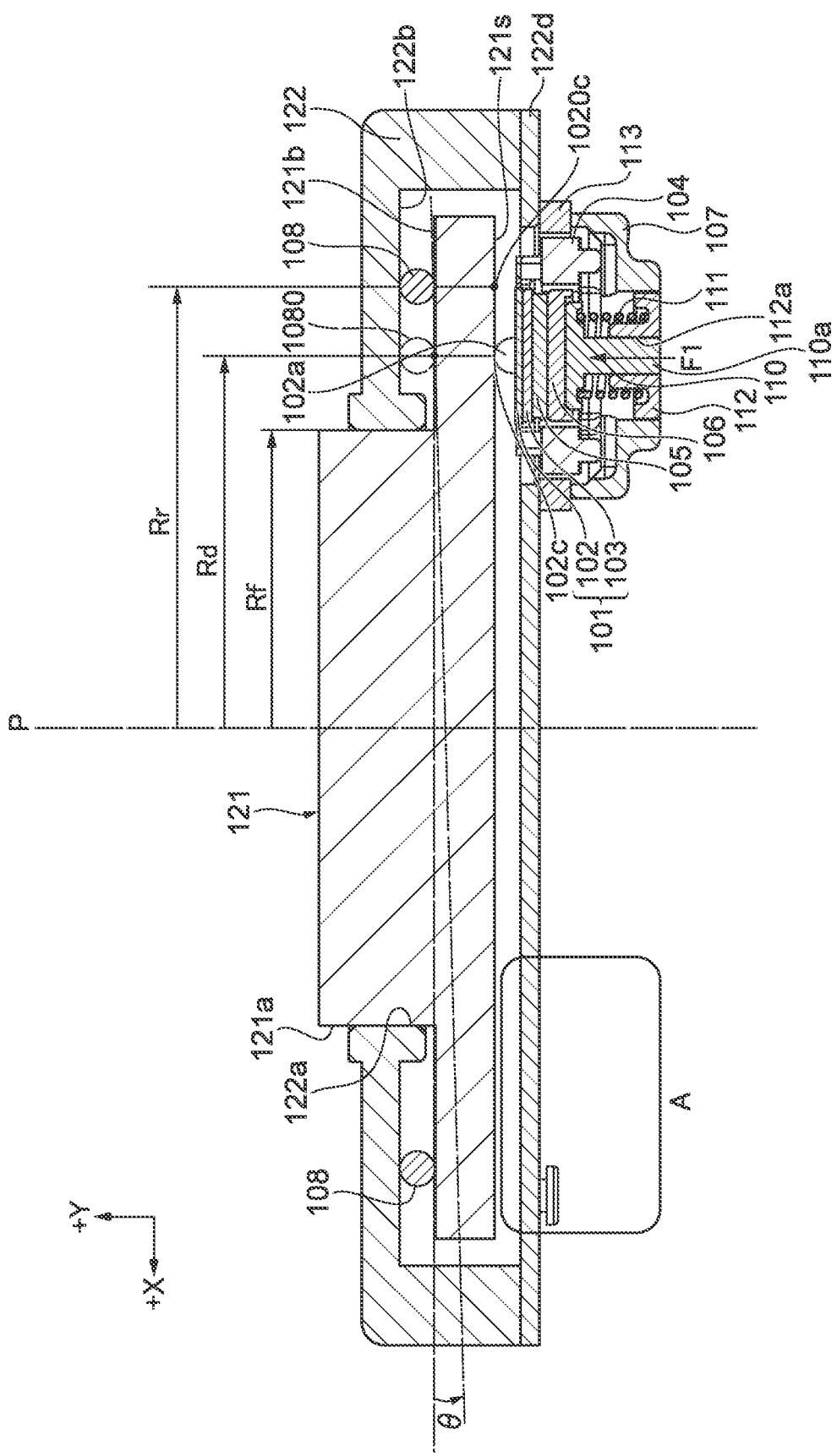
FIG. 4 is a sectional view showing a principal part of the vibration motor including a driven body that is shown in a simplified form.

FIG. 2 and FIG. 3 are exploded perspective views showing the vibration motor 100. FIG. 4 is a sectional view showing a principal part of the vibration motor 100 including the driven body 121 that is shown in a simplified form.

Hereinafter, directions of members will be called by referring to X, Y, and Z coordinate axes shown in FIG. 2, FIG. 3, etc. A direction parallel to the rotation axis P is defined as a Y-direction in this embodiment. Particularly, the side at which the driven body 121 is located with respect to the vibrator 101 is a +Y side in the Y-direction. A longitudinal direction of the vibrator 101 that coincides with a tangential direction of the driven body 121 is defined as a Z-direction. A direction that intersects perpendicularly with both the Y-direction and Z-direction is defined as an X-direction.

The vibration motor 100 mainly has the driven body 121 that constitutes a first unit, the support body 122 that constitutes a second unit, and a chassis 122d. The support body 122 holds the entire vibration motor 100. The driven body 121 is shaped in an approximate ring form as a whole. The driven body 121 has a shaft 121a, a rolling receiving portion 121b, and a contact surface (a contact portion) 121s. The contact surface 121s is a friction surface. A rotation support hole 122a is formed in the support body 122. The shaft 121a of the driven body 121 is rotatably fit into the rotation support hole 122a. Thereby, the entire driven body 121 is rotatable relatively with respect to the support body 122 around the rotation axis P. Accordingly, a support structure of the vibration motor 100 in the radial direction is a slide bearing structure.

Since the vibration motor 100 has a simple structure that determines a fitting relation in the radial direction by the rotation support hole 122a and shaft 121a, fitting accuracy is secured easily at relatively low cost. It should be noted that the driven body 121 may be constituted from a single member or may be constituted from separate members of the shaft 121a and a disc member including the contact surface 121s and rolling receiving portion 121b. Alternatively, the relation between the shaft 121a and the rotation support hole 122a may be inverted. That is, a shaft provided in the support body 122 may be fit into a rotation support hole provided in the driven body 121 so that the entire driven body 121 will be rotatable relatively with respect to the support body 122.

The vibrator 101 as a member of a drive unit has an elastic body 102 and a piezoelectric device 103. The piezoelectric device 103 is an electro-mechanical energy conversion element that excites vibration in the elastic body 102. The piezoelectric device 103 is made from PZT (lead zirconate titanate), for example. The elastic body 102 consists of a metal plate made from stainless steel, etc.

The elastic body 102 has two projections 102a, which are aligned in the longitudinal direction, and held portions 102b (FIG. 2). The elastic body 102 and the piezoelectric device 103 are adhered with adhesive etc. The projections 102a are in pressure contact with the contact surface 121s because the piezoelectric device 103 is pressed by a pressurizing mechanism mentioned later in a state where the elastic body 102 and the piezoelectric device 103 are adhered. Elliptic movement EM (FIG. 5C) occurs in each of the projections 102a of the elastic body 102 by vibration (ultrasonic vibration) of a frequency within an ultrasonic range that occurs by applying drive voltage of high-frequency alternate current to the piezoelectric device 103. As a result of this, driving force occurs between the projections 102a and the contact surface 121s. Driving force F2 (FIG. 3) mentioned later occurs at a position at which the projection 102a contacts the contact surface 121s.

A rolling receiving portion 122b that faces the rolling receiving portion 121b of the driven body 121 is formed in the support body 122. Rolling balls (six pieces in FIG. 2) 108 are provided between the rolling receiving portions 121b and 122b. That is, a support structure about the thrust direction of the vibration motor 100 is a rolling bearing structure, and the driven body 121 and support body 122 are mutually rotatable relatively through rotations of the rolling balls 108 smoothly. Thereby, frictional resistance caused when the driven body 121 moves while receiving the pressure force can be made small as much as possible.

Although the rolling receiving portion 122*b* and support body 122 may be configured by a single member, they may be configured by separate members. Moreover, although the rolling receiving portion 121*b* and driven body 121 may be configured by a single member, they may be configured by separate members. It should be noted that rolling members like rollers or slide members may be provided between the rolling receiving portion 122*b* and the rolling receiving portion 121*b* instead of the rolling balls 108.

A first holder 104 holds the elastic body 102 stationary by holding the held portions 102*b* of the elastic body 102. Thereby, the vibrator 101 moves together with the first holder 104. The chassis 122*d* is fixed to the support body 122. A frame member 113 holds the first holder 104 through an elastic connecting member 114. The first holder 104 is positioned and fixed to the driven body 121 by fixing the frame member 113 to the chassis 122*d* with screws 115.

An interception member 105 has a function that intercepts transmission of the vibration to other components. The interception member 105 intercepts transmission of the ultrasonic vibration of the piezoelectric device 103 to a small base 106 (mentioned later) but does not attenuate the ultrasonic vibration of the piezoelectric device 103. Felt fabric is suitable as material of the interception member 105. The small base 106 is in surface contact with the piezoelectric device 103 through the interception member 105 and has a function to transfer the pressure force by a pressurizing spring 111 to the piezoelectric device 103.

The pressurizing mechanism includes a pressure member 110, the pressurizing spring 111 as a pressurizing means, and a receiving member 112. A second holder 107 holds this pressurizing mechanism. The second holder 107 is fixed to the chassis 122*d* with two screws 115 together with the frame member 113. A fitting hole 112*a* as a circular hole is formed in the center of the receiving member 112. A thread part 112*b* is formed on an outer circumferential surface of the receiving member 112. The receiving member 112 is fixed to the second holder 107 by screwing the thread part 112*b* into the screw hole 107*a* of the second holder 107. Moreover, the fitting hole 112*a* engages and holds a fitting shaft 110*a* of the pressure member 110. The pressure member 110 is fit into the fitting hole 112*a* of the receiving member 112 and is held movable only in a direction that is approximately vertical to the contact surface 121*s* of the driven body 121.

The pressure member 110 transfers the pressure force from the pressurizing spring 111 to the vibrator 101 through the small base 106 and interception member 105. Thereby, the vibrator 101 is in pressure contact with the driven body 121. The pressurizing spring 111 consists of a compression spring, for example. One end of the pressurizing spring 111 is fixed to the receiving body 112 and the other end is abutted to the pressure member 110. In this way, the pressurizing spring 111 generates the pressure force Fl by fixing both ends in a compressed state. The generated pressure force Fl becomes force of a direction (+Y-direction) perpendicular to the contact surface 121s of the driven body 121 by being transferred to the piezoelectric device 103. The vibrator 101 is in pressure contact with the driven body 121 by the pressure force F1. Accordingly, the +Y-direction is a pressurizing direction by the pressurizing spring 111. The rolling balls 108 are examples of slide members that receive the pressure force F1 between the driven body 121 and the support body 122. Moreover, a pressurized position at which the pressure force F1 is applied is set at an approximate center between the two projections 102*a* of the elastic body 102 in the longitudinal direction of the vibrator 101. Thereby, the two projections 102*a* are in pressure contact with the driven body 121 in well balance.

In this way, the respective members are incorporated and unitized and the vibration motor 100 is constituted as a result. In this configuration, when the vibrator 101 vibrates and the elliptic movement EM (FIG. 5C) occurs in the projections 102*a*, the driving force F2 (FIG. 3) occurs between the projections 102*a* and the contact surface 121*s* of the driven body 121. Since the driving force F2 acts in the direction vertical to the radial direction passing the rotation axis P of the driven body 121, the driven body 121 is rotationally driven around the rotation axis P.

Figure 5C:
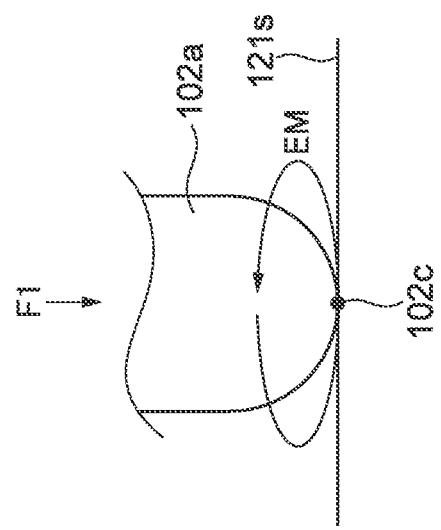
FIG. 5C is a schematic view showing a projection of the vibrator that performs elliptic movement.
Figure 5A:
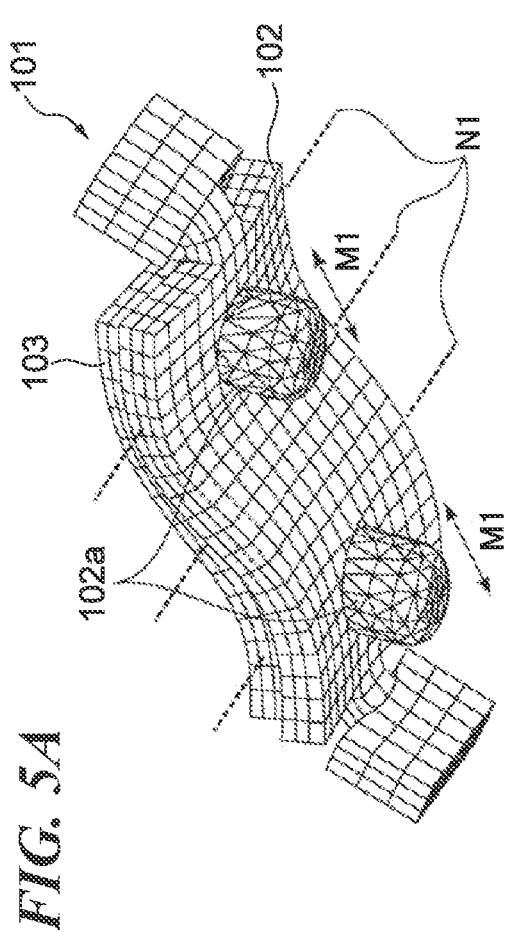
FIG. 5A and FIG. 5B are schematic views showing a vibration mode of a vibrator included in the vibration motor.
Figure 5B:
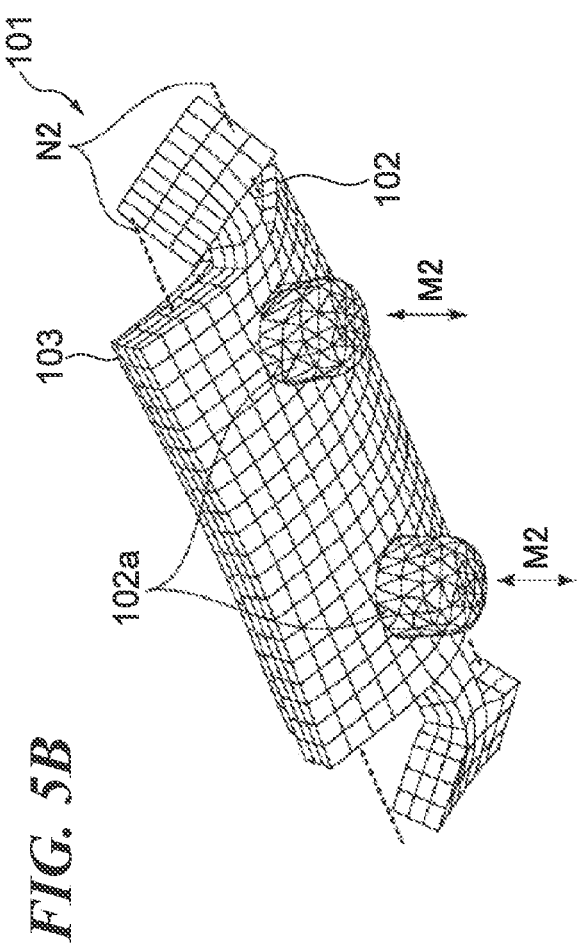

Next, a vibration mode of the vibrator 101 of the vibration motor 100 will be described using FIG. 5A, FIG. 5B, and FIG. 5C. FIG. 5A and FIG. 5B are schematic views showing the vibration mode of the vibrator 101. FIG. 5C is a schematic view showing the projection 102*a* that performs the elliptic movement EM.

The vibration mode of the vibrator 101 is a complex vibration including a first vibration and a second vibration. As shown in FIG. 5A, the first vibration generates reciprocating motions M1 shown by arrows in the projections 102*a* of the vibrator 101, and mainly displaces the projection 102*a* in the tangential direction of the contact surface 121*s*. In the first vibration, three nodes N1 shown by broken lines occur in the vibrator 101. Two nodes N1 in both end sides in the longitudinal direction of the vibrator 101 are located near the projections 102*a*.

As shown in FIG. 5B, the second vibration generates reciprocating motions M2 shown by arrows in the projections 102*a*, and mainly displaces the projections 102*a* in a direction to contact/separate to/from the contact surface 121*s*. In the second vibration, two nodes N2 shown by broken lines occur in the vibrator 101.

The first and second vibrations generated at the same frequency cause the elliptic movements EM at contact points 102*c* (FIG. 4 and FIG. 5C) of the projections 102*a* to the contact surface 121*s*. Although the vibrator 101 has a plurality of (two) contact points in order to generate more greatly the driving force F2 mentioned above, it may have a single contact point. Since details of a method for generating the first and second vibrations are well known as described in JP 2004-304887A mentioned above, detailed descriptions are omitted.

Next, a holding mechanism for the rolling balls 108 in the vibration motor 100 will be described by referring to FIG. 4, FIG. 6, FIG. 7A, and FIG. 7B. Moreover, a relation between the position at which the support body 122 supports the driven body 121, the position at which the vibrator 101 is in pressure contact with the driven body 121, and the position at which the rolling balls 108 contact the driven body 121 will be described.

Figure 6:
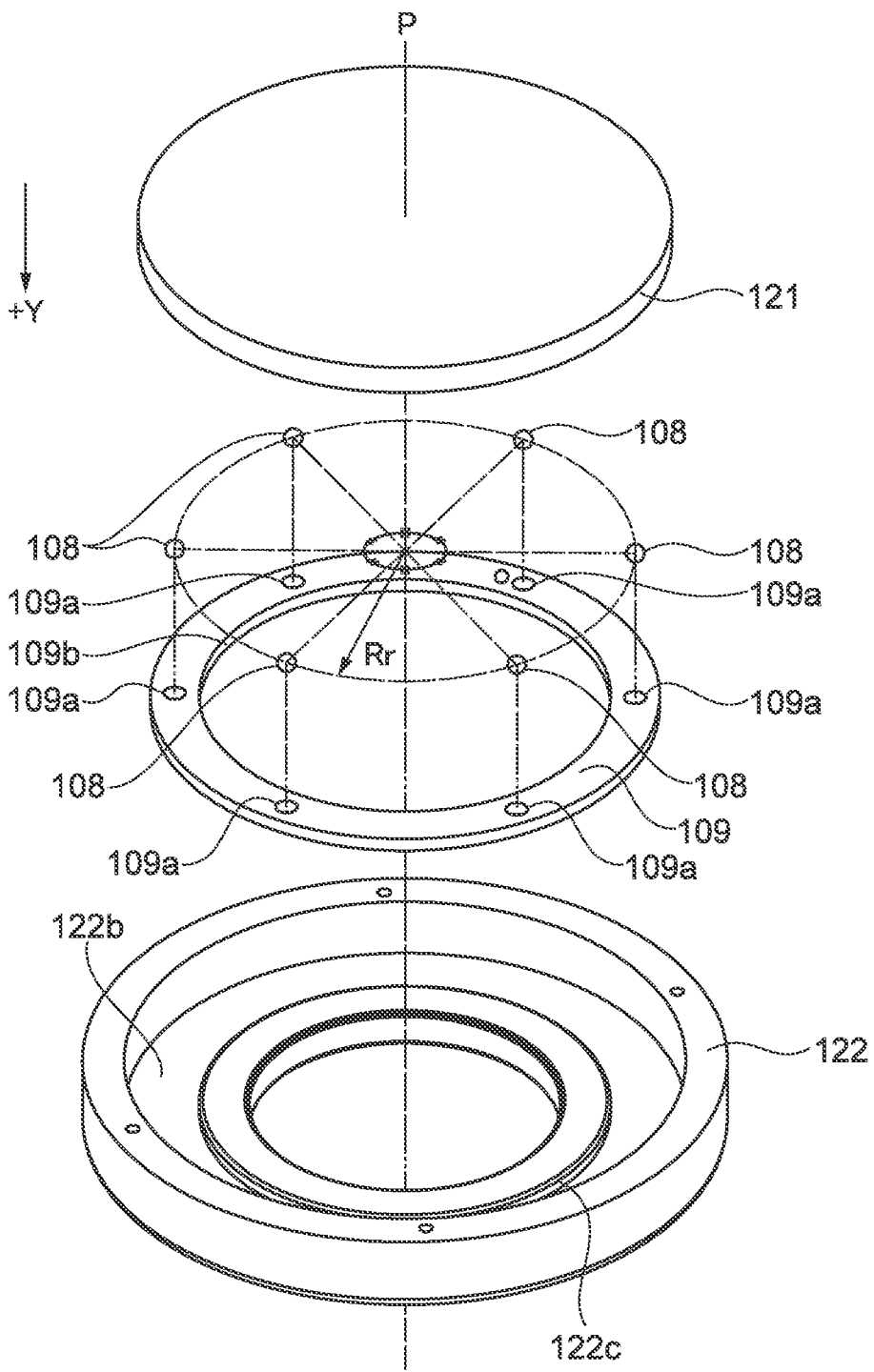
FIG. 6 is an exploded perspective view showing a principal part of a configuration that holds rolling balls included in the vibration motor.
Figure 7A:
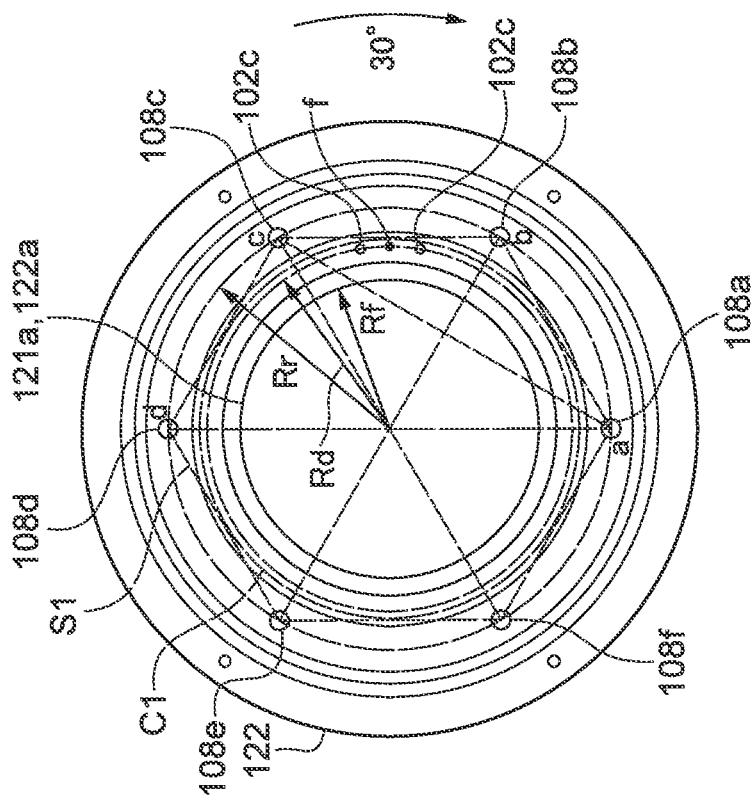
FIG. 7A and FIG. 7B are views describing an arrangement of the rolling balls viewed from a −Y side.
Figure 7B:
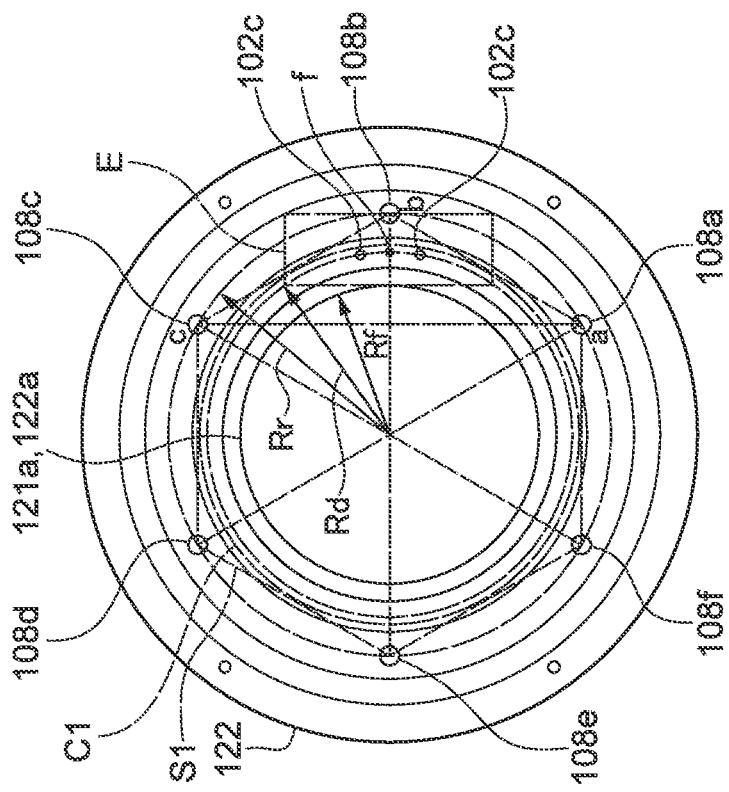

FIG. 6 is an exploded perspective view showing a principal part of a configuration that holds the rolling balls 108 between the driven body 121 and the support body 122. FIG. 7A and FIG. 7B are views describing an arrangement of the rolling balls 108 viewed from a −Y side.

Although not shown in FIG. 1, through FIG. 4, a retainer 109 intervenes between the rolling receiving portion 121*b* of the driven body 121 and the rolling receiving portion 122*b* of the support body 122. The retainer 109 is a ring shaped member. An inner periphery 109*b* of the retainer 109 is rotatably fit to a retainer fitting part 122*c* formed in the support body 122. The retainer 109 has ball holding holes 109a for holding the rolling balls 108. The ball holding holes 109a are arranged at approximately equal regular intervals (60 degrees intervals) in a circumferential direction. Since the rolling balls 108 are housed in the ball holding holes 109a, the rolling balls 108 are held at approximately equal intervals in the circumferential direction. That is, the retainer 109 is a holding member that holds three or more rolling balls 108 so as to be movable in the circumferential direction around the rotation axis P accompanying to the relative rotation of the driven body 121 and support body 122. The retainer 109 regulates the intervals between the three or more rolling balls 108 so that the three or more rolling balls 108 may not contact mutually.

Alternatively, the rolling balls 108 may be held by not the retainer 109 but an annular groove. For example, the annular groove around the rotation axis P is formed in the support body 122. The rolling balls 108 are arranged in this annular groove. The rolling balls 108 can roll with respect to the driven body 121 and support body 122 in a state where the positions of the rolling balls 108 in the radius direction are regulated. It should be noted that the number of the rolling balls 108 is not limited to six. At least three rolling balls 108 are necessary in order to keep the rotation stably. That is, the number of the slide members like the rolling balls 108 is not limited to six. At least three slide members are necessary so as to surround the rotation axis P.

A radius of the rolling locus of the rolling balls 108 around the rotation axis P is a revolution radius Rr. The revolution radius Rr is a third distance from the rotation axis P to a third position at which a rolling ball 108 contacts the rolling receiving portion 121b of the driven body 121 in a projection view projected to a plane perpendicular to the rotation axis P. Since the inner periphery 109b of the retainer 109 is rotatably fit to the retainer fitting part 122c of the support body 122, the rolling balls 108 are held in a state where the revolution radius Rr and the intervals in the circumferential direction are regulated.

It should be noted that the center of the retainer fitting part 122c is approximately coincident with the rotation axis P. Moreover, the diameter of the ball holding holes 109a of the retainer 109 is larger than the diameter of the rolling balls 108, and the thickness of retainer 109 the very thing is smaller than the diameter of the rolling balls 108. Accordingly, the rolling balls 108 become able to rotate and to revolve while keeping the mutual intervals, which enables good holding.

As mentioned above, the shaft 121a of the driven body 121 rotatably fits into the rotation support hole 122a of the support body 122. As shown in FIG. 4, FIG. 7A, and FIG. 7B, in the projection view projected to the plane perpendicular to the rotation axis P, a first distance from the rotation axis P to a first position at which the shaft 121a is supported by the rotation support hole 122a in the radial direction is called a fitting radius Rf. Moreover, in the projection view projected to the plane perpendicular to the rotation axis P, a second distance from the rotation axis P to a second position at which the projection 102a of the vibrator 101 is in pressure contact with the contact surface 121s of the driven body 121 is called a drive radius Rd. The second position is also a position at which the driving force F2 (FIG. 3) generates.

The fitting radius Rf is shorter than the drive radius Rd and the revolution radius Rr is longer than the drive radius Rd. That is, the following relationship is satisfied: the fitting radius Rf<the drive radius Rd<the revolution radius Rr. An engagement relation between the rotation support hole 122a and the shaft 121a forms a sliding friction part, and an engagement relation of the rolling balls 108 and the rolling receiving portion 121b forms a rolling friction part. The frictional force of the sliding friction part is larger than that of the rolling friction part. That is, the sliding friction part that is larger in the slide friction is provided at the inside of the contact positions between the projections 102a and the contact points 102c in the radial direction. And the rolling friction part that is smaller in the slide friction is provided at the outside of the contact positions in the radial direction. Thereby, the loss of the driving force due to the sliding friction among the losses of the driving forces due to the frictions between the members generated accompanying to the rotational drive is prevented.

Moreover, since the drive radius Rd is less than the revolution radius Rr and since the contact positions between the rolling balls 108 and the rolling receiving portion 121b is located outside the contact positions between the projections 12a and the contact points 102c, enlargement of the vibration motor 100 is controlled. For example, as shown in FIG. 7A, when a contour E of the vibrator 101 is projected to the plane perpendicular to the rotation axis P, the contact points 102c of the vibrator 101 are located inside the circle of the revolution radius Rr and the contour E partially overlaps with the circle of the revolution radius Rr. That is, at least a part of the vibrator 101 is arranged side by side with a slide locus (rolling locus) of the rolling balls 108 in the direction parallel to the rotation axis P. Thereby, the enlargement of the vibration motor 100 in the radial direction is avoided. Particularly, when the plurality of contact points 102c is provided in order to enlarge the driving force F2 as in the embodiment, the contour E of the vibrator 101 tends to enlarge. However, the above-mentioned configuration enables a layout of high space efficiency, and the miniaturization of the vibration motor 100 becomes easy.

Furthermore, since the drive radius Rd is less than the revolution radius Rr, stable rotational drive becomes available. For comparison, a contact point 1020c and a rolling ball 1080 shown in FIG. 4 will be described. A virtual case is considered. In the virtual case, the vibration motor 100 is provided so that the contact point 1020c of the vibrator 101 will be coincident with the position of the revolution radius Rr and the rolling ball 1080 is provided at the position of the drive radius Rd. In the virtual case, the rolling ball 1080 always revolves inside the contact point 1020c of the vibrator 101 in the radial direction. Accordingly, when pressure force is given to the contact point 1020c, inclination θ around the rolling ball 1080 may occur, for example.

When an inclination prevention mechanism as described in JP 2006-158054A is provided in an area A (FIG. 4) opposite to the contact point 1020c across the rotation axis P in order to offset the inclination θ, the motor size will be enlarged and the cost will increase. In the embodiment, the inclination θ mentioned above is prevented by providing the rolling balls 108 outside the contact points 102c, which enables stable rotational drive.

It is necessary to satisfy a certain condition in order to prevent occurrence of the inclination θ around the rolling ball 108 even if the rolling balls 108 are in any rotation phase by the revolution of the rolling balls 108. A preferable positional relationship of the rolling balls 108 and the vibrator 101 is described.

First, as shown in FIG. 7A, the case where the rolling balls 108a through 108f are arranged at equal intervals (60 degrees intervals) in the circumferential direction is considered. A midpoint of the contact points 102c of the projections 102a to the contact surface 121s of the driven body 121 by the pressurizing mechanism is defined as a pressurizing position f. The pressurizing position f is approximately located on the circle of the drive radius Rd. In the projection view projected to the plane perpendicular to the rotation axis P, a polygon S1 obtained by connecting the centers of the rolling balls 108 and an inscribed circle C1 of the polygon S1 are defined. The contact points 102c of the vibrator 101 and the pressurizing position f are located inside the inscribed circle C1 of the polygon S1. When the above positional relationship is satisfied, the contact points 102c and the pressurizing position f are always located in at least one of the triangles obtained by connecting the centers of the rolling balls 108 even if the rolling balls 108 are in any rotation phase.

For example, in the state of FIG. 7A, the contact points 102c and the pressurizing position f are located in a triangle abc obtained by connecting the centers of the rolling balls 108a, 108b, and 108c. FIG. 7B shows a rotation phase of the rolling balls 108 that is obtained by revolving the rolling balls 108 by 30 degrees around the rotation axis P from the state shown in FIG. 7A. Also, in the state shown in FIG. 7B, the contact points 102c of the vibrator 101 and the pressurizing position f are located in the triangle abc obtained by connecting the centers of the rolling balls 108a, 108b, and 108c.

In this way, since the pressure force is supported by three points a, b, and c, the occurrence of the inclination θ mentioned above can be prevented. When the above positional relationship is satisfied, the similar effect can be obtained even if the rolling balls 108 are in any rotation phase. Incidentally, in the example shown in FIG. 7B, the pressurizing position f is not only located in the triangle abc but is also located in a triangle bcd obtained by connecting the centers of the rolling balls 108b, 108c, and 108d. It should be noted that at least the pressurizing position f should be located inside the inscribed circle C1 of the polygon S1 obtained by connecting the centers of the rolling balls 108. It is not indispensable that adjacent rolling balls 108 form a triangle. In other words, it is enough that there are three rolling balls 108 so that the pressurizing position f will be located in the triangle obtained by connecting the centers of the three rolling balls 108. Moreover, the contact points 102c of the projections 102a that contact the contact surface (a contact portion) 121s should be located in any triangular area of one or more triangular areas formed by connecting any three rolling balls 108 with straight lines among the three or more rolling balls (support members) when viewed in the Y-direction.

Although the rolling balls 108 are arranged at equal intervals (60 degrees intervals) in the circumferential direction around the rotation axis P in the example shown in FIG. 6, FIG. 7A, and FIG. 7B, the rolling balls 108 do not necessarily need to be arranged at equal intervals. A modified example in which the rolling balls 108 are arranged at unequal intervals will be described by referring to FIG. 8A and FIG. 8B.

Figure 8A:
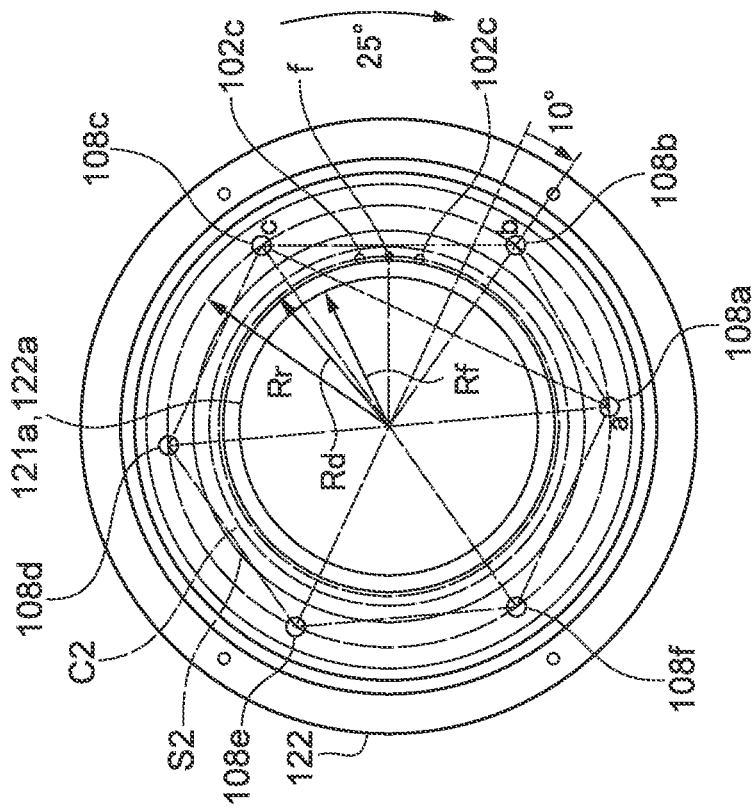
FIG. 8A and FIG. 8B are views describing the arrangement of the rolling balls viewed from the −Y side.
Figure 8B:
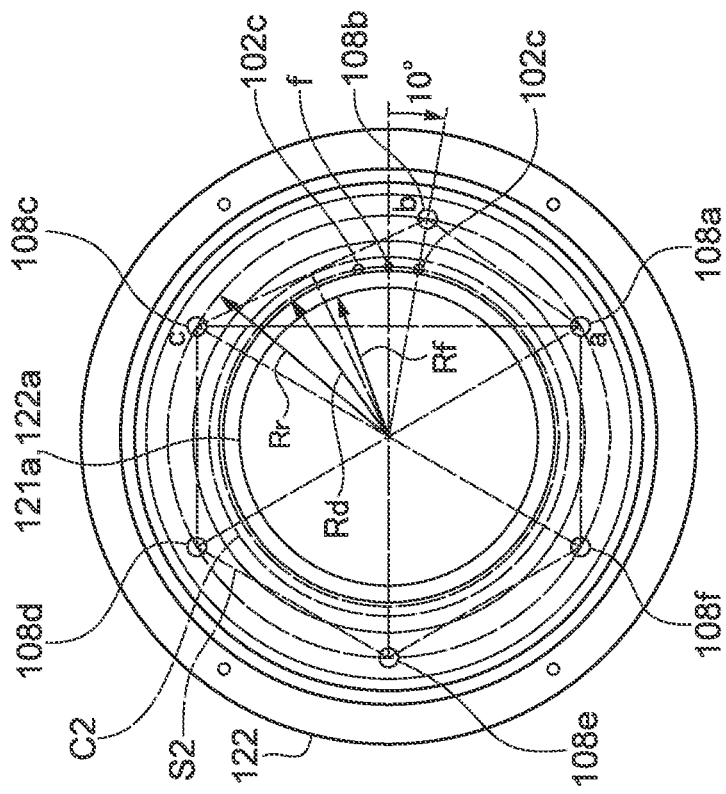

FIG. 8A and FIG. 8B are views describing the arrangement of the rolling balls 108 viewed from the −Y side. In the example shown in FIG. 8A, the rolling ball 108b is arranged at a position that is displaced by 10 degrees in the circumferential direction from the equal interval position (FIG. 7A). The contact points 102c and the pressurizing position f are arranged so as to be located inside a circle C2 that contacts a side bc that is the nearest to the rotation axis P among sides of a polygon obtained by connecting the centers of the rolling balls 108 and that is centering on the rotation axis P.

When the above positional relationship is satisfied, the contact points 102c of the vibrator 101 and the pressurizing position f are always located in at least one of the triangles obtained by connecting the centers of the rolling balls 108 even if the rolling balls 108 are in any rotation phase. Also, in the state shown in FIG. 8A, the contact points 102c and the pressurizing position f are located in the triangle abc obtained by connecting the centers of the rolling balls 108a, 108b, and 108c. In this way, since the pressure force is supported by three points a, b, and c, the occurrence of the inclination θ mentioned above can be prevented.

FIG. 8B shows a rotation phase of the rolling balls 108 that is obtained by revolving the rolling balls 108 by 25 degrees around the rotation axis P from the state shown in FIG. 8A. Also, in the state shown in FIG. 8B, the contact points 102c and the pressurizing position f are located in the triangle abc obtained by connecting the centers of the rolling balls 108a, 108b, and 108c. In this way, since the pressure force is supported by the triangle abc, the occurrence of the inclination θ mentioned above can be prevented. When the above positional relationship is satisfied, the similar effect can be obtained even if the rolling balls 108 are in any rotation phase. Incidentally, in the example shown in FIG. 8B, the pressurizing position f is not only located in the triangle abc but is also located in a triangle bcd obtained by connecting the centers of the rolling balls 108b, 108c, and 108d.

It should be noted that at least the pressurizing position f should be located inside the circle C2 that contacts a side that is the nearest to the rotation axis P among the sides of the polygon obtained by connecting the centers of the rolling balls 108 and that is centering on the rotation axis P.

According to the embodiment, in the projection view projected to the plane perpendicular to the rotation axis P, the fitting radius Rf is shorter than the drive radius Rd, and the revolution radius Rr is longer than the drive radius Rd. Thereby, since the loss of the driving force due to the sliding friction is reduced, the driving load can be reduced. Moreover, since the high processing accuracy for coincidence of the diameters of the V grooves and for elimination of decentering is not required unlike the configuration of JP 2006-158054A, the configuration is simple and the cost rise is prevented. Accordingly, the vibration driving device that achieves low cost and high accuracy while reducing driving load can be provided.

Moreover, the pressurizing position f is located inside the circle C2 that contacts a side that is the nearest to the rotation axis P among the sides of the polygon obtained by connecting the centers of the rolling balls 108 and that is centering on the rotation axis P. This condition is satisfied in the example shown in FIG. 7A and FIG. 7B and the example shown in FIG. 8A and FIG. 8B. Alternatively, when the rolling balls 108 are arranged on the concentric circle around the rotation axis P at the approximately equal intervals (FIG. 7A and FIG. 7B), the pressurizing position f is located inside the inscribed circle C1 of the polygon S1 obtained by connecting the centers of the rolling balls 108. This condition is satisfied in the example shown in FIG. 7A and FIG. 7B. These configurations prevent the occurrence of the inclination θ and enable the stable rotational drive. Moreover, since an inclination prevention mechanism becomes unnecessary, it contributes to miniaturization.

Figure 9A:
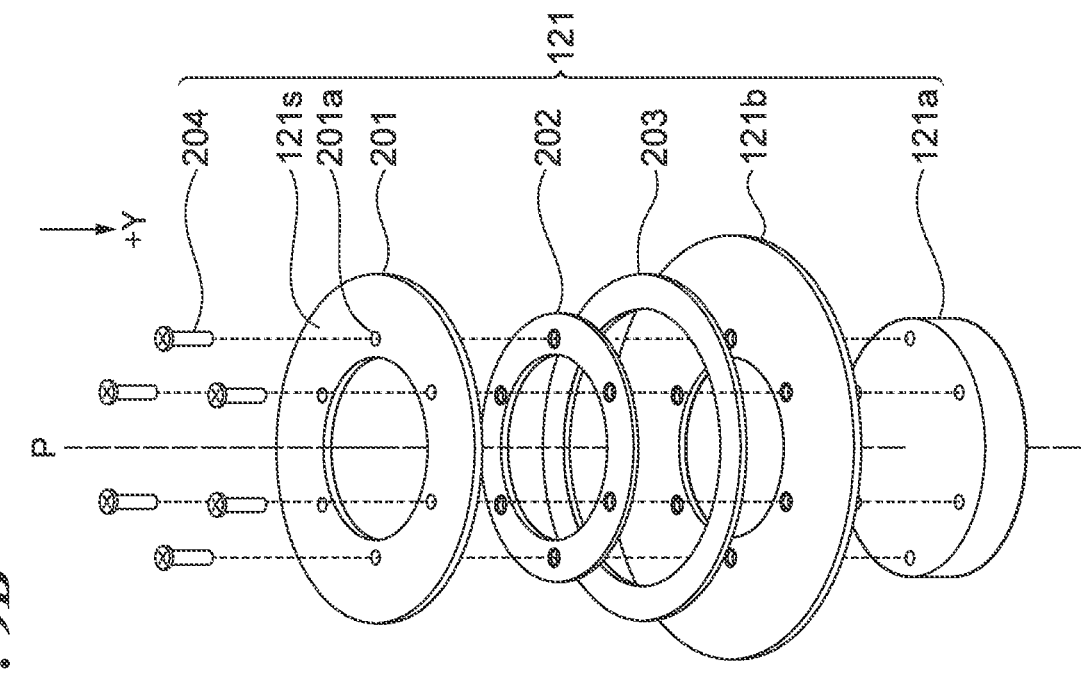
FIG. 9A and FIG. 9B are exploded perspective views showing the driven body included in the vibration motor.
Figure 9B:
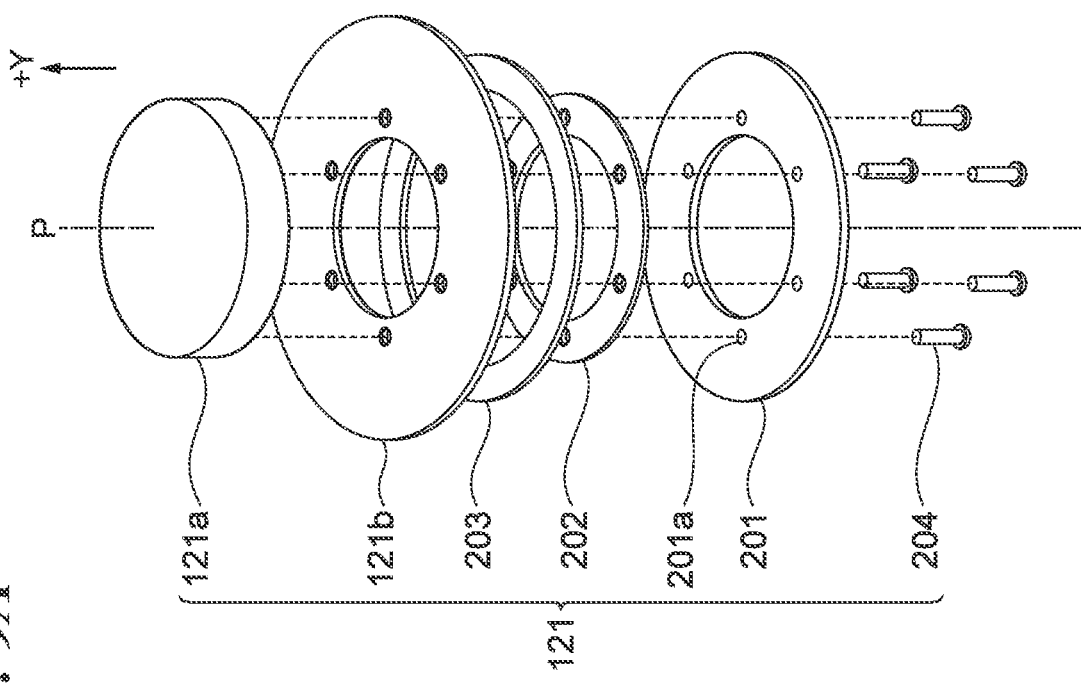
Figure 10:
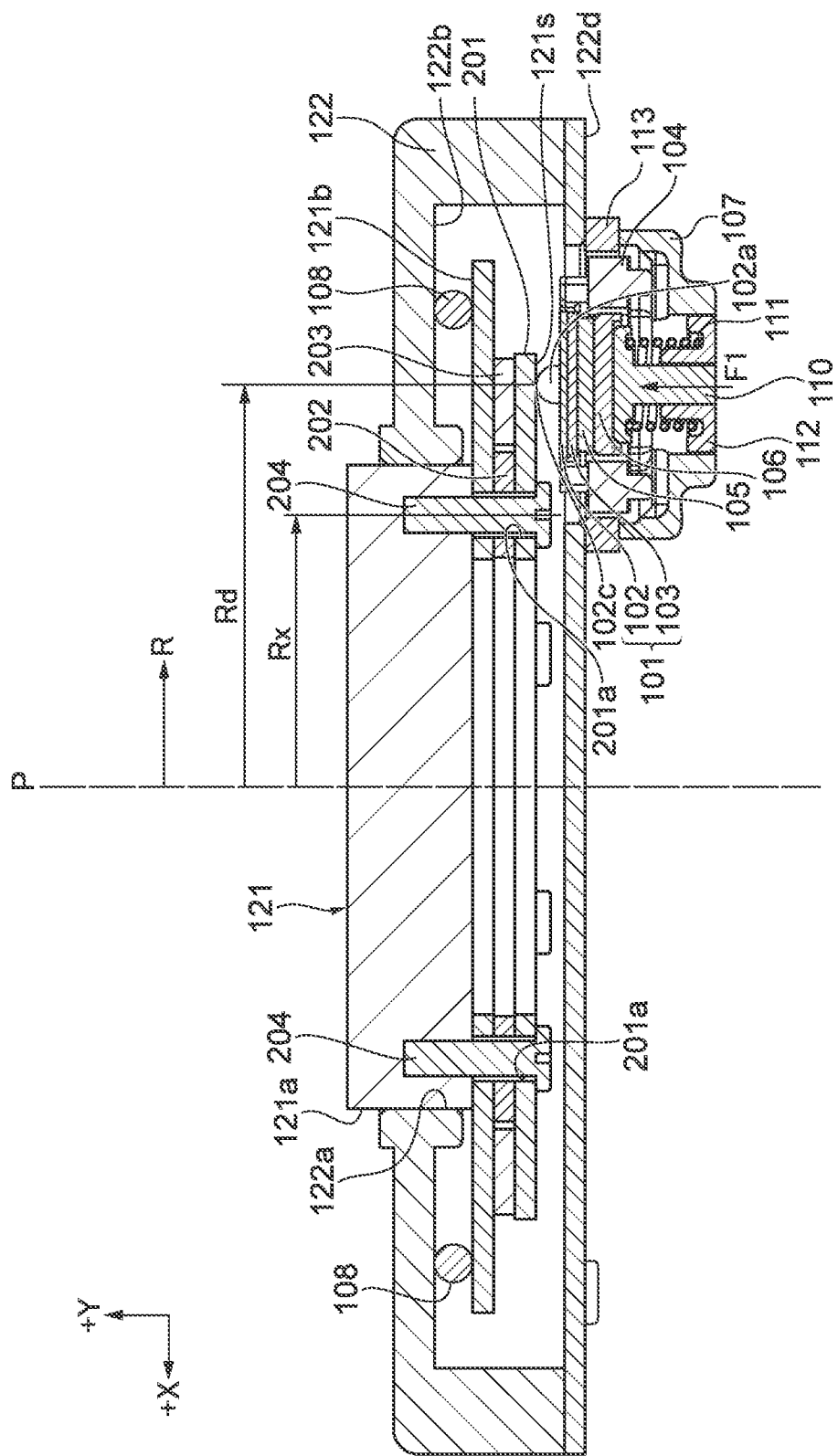
FIG. 10 is a sectional view showing the principal part of the vibration motor and the driven body that is shown in detail.

Next, the configuration of the driven body 121 will be described in detail by referring to FIG. 9A, FIG. 9B, and FIG. 10. FIG. 9A and FIG. 9B are exploded perspective views showing the driven body 121. FIG. 10 is a sectional view showing a principal part of the vibration motor 100 and the driven body 121 that is shown in detail.

The driven body 121 is schematically shown in FIG. 2, FIG. 3, and FIG. 4 in the simplified form. As shown in FIG. 9A and FIG. 9B, the driven body 121 that constitutes the first unit has the shaft (a base member) 121a, the rolling receiving portion (a second member) 121b, a friction member (a first member) 201, a spacer 202, an attenuation member 203, and connecting members 204. In FIG. 9A, FIG. 9B, and FIG. 10, the members that constitute the driven body 121 are shown individually.

Although it is not shown in FIG. 10, the retainer 109 that holds the rolling balls 108 as shown in FIG. 6 intervenes between the rolling receiving portion 121b of the driven body 121 and the rolling receiving portion 122b of the support body 122.

The friction member 201 is a ring-shaped member that has the contact surface 121s. The spacer 202 and the rolling receiving portion 121b intervene between the friction member 201 and the shaft 121a in order from the side of the friction member 201. Furthermore, the attenuation member 203 is nipped between the friction member 201 and the rolling receiving portion 121b so as to surround the spacer 202. Six through holes through which a plurality of connecting members (six fixing members) 204 like screws respectively penetrate are formed in each of the friction member 201, spacer 202, and rolling receiving portion 121b. The holes of the friction member 201 are the fixed parts 201a. The positions of the fixed parts 201a of the friction member 201 in the radial direction R are mutually common. The six fixed parts 201a are arranged at approximately equal intervals. The number does not matter. Six screw holes to which the six connecting members 204 are respectively tightened are formed in the shaft (base member) 121a.

The friction member 201 is fixed to the shaft 121a with the connecting members 204. The spacer 202 and rolling receiving portion 121b are also fixed to the shaft 121a together with the friction member 201 in the lump with the connecting members 204 that are the same fixing members (in a co-fastening state). By such a configuration, the shaft 121a as the base member holds the friction member 201. Moreover, the rolling receiving portion 121b as a pressure receiving member receives the pressure force F1 from the vibrator 101 resulting from the pressurizing mechanism between the friction member 201 and the rolling receiving portion 122b of the support body 122. The spacer 202 has rigidity higher than the friction member 201.

As shown in FIG. 10, the radial direction R starts at the rotation axis P and intersects perpendicularly with the rotation axis P. Moreover, in the projection view projected to the plane perpendicular to the rotation axis P (i.e., in the radial direction R), a second distance from the rotation axis P to a second position at which the projection 102a of the vibrator 101 is in pressure contact with the contact surface 121s of the driven body 121 is called the drive radius Rd. The second position is also a position at which the driving force F2 (FIG. 3) generates. Moreover, in the radial direction R, a distance from the rotation axis P to a fourth position at which the friction member 201 and rolling receiving portion 121b are collectively fixed to the shaft 121a is called a fixed position radius Rx. The fixed position radius Rx is smaller than the drive radius Rd.

Since the rolling receiving portion 121b is fixed together with the friction member 201 with the connecting members 204, enlargement in the radial direction R is avoided as compared with a configuration that individually fixes the rolling receiving portion 121b and the friction member 201.

If the prevention of only the enlargement in the radial direction R is considered, a method that shifts the fixing positions of the friction member 201 from the fixing positions of the rolling receiving portion 121b along the circumferential direction around the rotation axis P can be considered. For example, each of the members may be fixed at three points at intervals of 120 degrees and the fixing points of the members may be shifted by 60 degrees mutually.

However, according to this method, the shape of the friction member 201 will become an asymmetrical odd shape about the rotation axis P, which tends to have unnecessary resonance. Since the fixing positions of the rolling receiving portion 121b are common to the fixing positions of the friction member 201 in the embodiment, the friction member 201 does not become an asymmetrical odd shape and becomes a shape that hardly generates the unnecessary resonance. Moreover, the rolling receiving portion 121b does not become an asymmetrical odd shape as well as the friction member 201. Since the rolling receiving portion 121b does not become an asymmetrical odd shape, unnecessary resonance in the rolling receiving portion 121b caused by vibration propagated from the friction member 201 through the spacer 202 is hardly generated.

The circle of the fixed position radius Rx and the circle of the drive radius Rd are adjacent and close. In the projection view projected to the plane perpendicular to the rotation axis P, the position at which the friction member 201 and rolling receiving portion 121b nip the attenuation member 203 overlaps with the circle of the drive radius Rd. In other words, the friction member 201 and rolling receiving portion 121b are nipping the attenuation member 203 in the area that includes the circle of the drive radius Rd in the radial direction R.

In the embodiment, the friction member 201 and rolling receiving portion 121b are collectively fixed to the shaft 121a with the connecting members 204 at fourth positions on the circle of the fixed position radius Rx that are inside the second positions on the circle of the drive radius Rd. First, the vibration can be attenuated by fixing the friction member 201 to the shaft 121a with the connecting members 204. As a result, unnecessary resonance of the friction member 201 is reduced and drive performance is improved.

Moreover, since the positions of the fixed parts 201a are inside the second positions at which the vibrator 101 contacts the friction member 201, the friction member 201 can be held and fixed at the positions near the centroid of the driven body 121, and the moment of inertia of the entire driven body 121 can be suppressed so as to be small. As a result, the drive performance is improved. Furthermore, since the rolling receiving portion 121b and friction member 201 are collectively fixed to the shaft 121a, enlargement in the radial direction R is avoided as compared with a configuration that individually fixes the rolling receiving portion 121b and the friction member 201. Moreover, the friction member 201 can be prevented from becoming an odd shape, and unnecessary resonance of the friction member 201 is reduced. Accordingly, the enlargement can be controlled while securing good drive performance.

Particularly, since the connecting members 204 collectively fix the friction member 201 and rolling receiving portion 121b at concentric positions around the rotation axis P, a space in the radial direction R is saved.

Moreover, the friction member 201 and rolling receiving portion 121b are nipping the attenuation member 203 in the area that includes the circle of the drive radius Rd in the radial direction R. Thereby, the unnecessary resonance of the friction member 201 can be attenuated further, and moreover, it does not lead to enlargement.

Moreover, since the circle of the fixed position radius Rx and the circle of the drive radius Rd are adjacent and close in the radial direction R, a length of a beam can be shortened when the friction member 201 is regarded as the beam prolonged in the radial direction R. As a result, it contributes to control of the unnecessary resonance of the friction member 201. Furthermore, from this point of view, when the difference between the fixed position radius Rx and the drive radius Rd is enough shorter than the fixed position radius Rx, the effect of resonance control is obtained.

Moreover, the spacer 202 of which the rigidity is higher than that of the friction member 201 intervenes between the friction member 201 and the rolling receiving portion 121b. Thereby, a vibration attenuation effect obtained by fixing the friction member 201 can be heightened.

Figure 11:
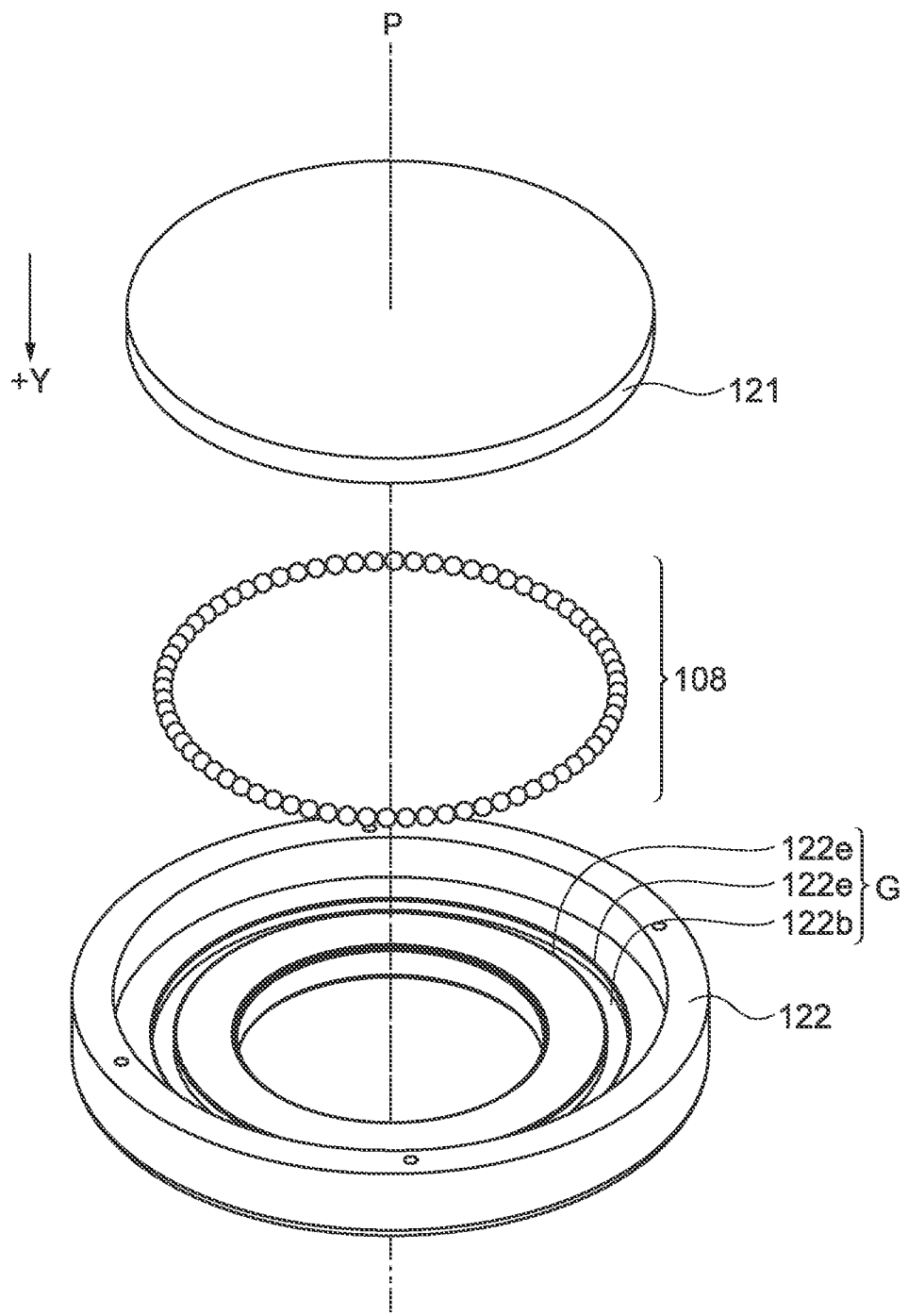
FIG. 11 is an exploded perspective view of a principal part of a configuration that holds rolling balls included in a vibration motor as a vibration driving device according to a second embodiment of the present invention.
Figure 12A:
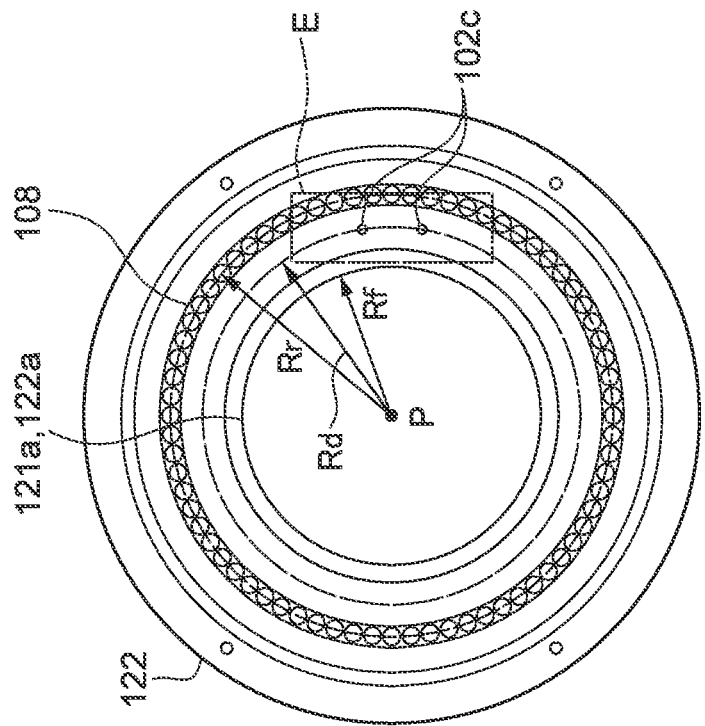
FIG. 12A and FIG. 12B are views describing an arrangement of the rolling balls viewed from the −Y side.
Figure 12B:
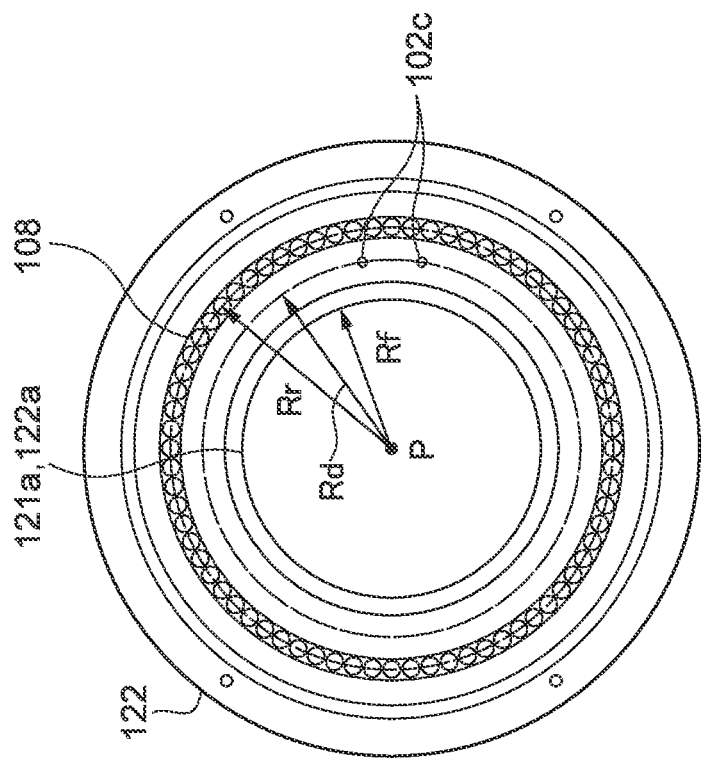

Next, a second embodiment will be described. FIG. 11 is an exploded perspective view showing of a principal part of a mechanism of holding the rolling balls 108 between the driven body 121 and the support body 122 in the second embodiment of the present invention. FIG. 12A and FIG. 12B are views describing an arrangement of the rolling balls 108 viewed from a −Y side.

In the embodiment, the number of the rolling balls 108 and the holding mechanism of the rolling balls 108 differ from that of the first embodiment, and the other configurations are identical. FIG. 11 and FIG. 12B respectively correspond to FIG. 6 and FIG. 7A.

The vibration motor 100 of the embodiment does not have the retainer 109. The rolling balls 108 are held by only the support body 122 and driven body 121. Specifically, an annular groove G is formed in the support body 122. The annular groove G is constituted by the rolling receiving portion 122b and a pair of side walls 122e. The rolling balls 108 are arranged in the annular groove G. The center of the annular groove G is approximately coincident with the rotation axis P. A distance from the rotation axis P to a center position of the annular groove G in the radial direction R is equal to the revolution radius Rr. Accordingly, the rolling balls 108 can roll with respect to the driven body 121 and support body 122 in a state where the positions of the rolling balls 108 in the radius direction are regulated.

Since the rolling balls 108 are arranged in the annular groove G so as to have proper backlashes in the circumferential direction and radial direction, the rolling balls 108 can rotate and revolve while keeping mutual intervals between the rolling balls 108 approximately constant, which enables good rotation holding. The relation between the drive radius Rd, the fitting radius Rf, and the revolution radius Rr is the same as that of the first embodiment. Moreover, the relation between the contour E of the vibrator 101 and the revolution radius Rr is the same as that of a first embodiment (FIG. 12B). It should be noted that the annular groove G is formed in the support body 122 that is one of the driven body 121 and support body 122. That is different from the configuration of the above-mentioned JP 2006-158054A that forms the V grooves at both sides. Accordingly, since high processing accuracy is not required, the configuration is simple and the cost rise is prevented. When a groove is not a V groove, the annular grooves G may be formed in both the driven body 121 and support body 122.

According to the embodiment, the same effect as that of the first embodiment is obtained about a provision of a low cost and highly accurate vibration driving device while reducing the driving load.

Although the example that drivingly rotates the image pickup apparatus 21 by the vibration motor 100 is described in each of the embodiments mentioned above, the present invention is applicable to an apparatus that has a movable body that is drivingly rotated by the vibration motor 100. For example, a laser irradiation device, an arm unit of a robot arm, etc. correspond to the movable body in that case.

In each of the embodiments, a word to which a modifier "approximately" or "approximate" is added does not exclude exact match. For example, "approximately equal intervals", "approximately coincident", "approximately constant", "approximate center", "approximate ring form", and "approximately equal" respectively include "equal intervals", "coincident", "constant", "center", "ring form", and "equal".

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-145845 and No. 2020-145846 filed Aug. 31, 2020, which are hereby incorporated by reference herein in their entireties.

What is claimed is:

1. A vibration driving device comprising:
    a drive unit to having a vibrator provided with a projection and configured to generate driving force by vibrating the vibrator;
    a first unit having a contact portion with which the projection is in pressure contact in a first direction;
    a second unit configured to rotate relatively with respect to the first unit around a predetermined rotation axis that is parallel to the first direction by the driving force of the drive unit; and
    three or more support members between the first unit and the second unit in the first direction and configured to support the first unit and the second unit so as to be rotatable relatively,
    wherein the support members are positioned such that, during relative rotation of the first unit and the second unit, a contact point at which the projection contacts the contact portion is always located in at least one triangular area of one or more triangular areas formed by connecting any three support members with straight lines among the three or more support members when viewed in the first direction.

2. The vibration driving device according to claim 1, wherein, during relative rotation of the first unit and the second unit, the contact point is never coincident with any of the three or more support members when viewed in the first direction.

3. The vibration driving device according to claim 1, further comprising a holding member that holds the three or more support members so as to be movable in a circumferential direction of the predetermined rotation axis accompanying to relative rotation of the first unit and the second unit.

4. The vibration driving device according to claim 3, wherein the holding member is configured to regulate intervals between the three or more support members so that the three or more support members may not contact mutually.

5. The vibration driving device according to claim 1, wherein the first unit has a first member having the contact portion, a second member contacting the three or more support members, and an attenuation member between the first member and the second member.

6. The vibration driving device according to claim 5, wherein the first unit has fixing members that fix the first member, the second member, and the attenuation member to a base member.

7. The vibration driving device according to claim 6, wherein a distance between the predetermined rotation axis and the fixing members is shorter than distance between the predetermined rotation axis and the projection in a plane that intersects perpendicularly with the first direction.

8. An image pickup apparatus comprising:
- a drive unit having a vibrator provided with a projection and configured to generate driving force by vibrating the vibrator;
- a first unit having a contact portion with which the projection is in pressure contact in a first direction;
- a second unit configured to rotate relatively with respect to the first unit around a predetermined rotation axis that is parallel to the first direction by the driving force of the drive unit;
- three or more support members between the first unit and the second unit in the first direction and configured to support the first unit and the second unit so as to be rotatable relatively; and
- an image pickup unit of which an image pickup direction varies according to the relative rotation of the first unit and the second unit,
- wherein the support members are positioned such that, during relative rotation of the first unit and the second unit, a contact point at which the projection contacts the contact portion is always located in at least one triangular area of one or more triangular areas formed by connecting any three support members with straight lines among the three or more support members when viewed in the first direction.

9. The image pickup apparatus according to claim 8, wherein, during relative rotation of the first unit and the second unit, the contact point is never coincident with any of the three or more support members when viewed in the first direction.

10. The image pickup apparatus according to claim 8, further comprising a holding member that holds the three or more support members so as to be movable in a circumferential direction of the predetermined rotation axis accompanying to relative rotation of the first unit and the second unit.

11. The image pickup apparatus according to claim 10, wherein the holding member is configured to regulate intervals between the three or more support members so that the three or more support members may not contact mutually.

12. The image pickup apparatus according to claim 8, wherein the first unit has a first member having the contact portion, a second member contacting the three or more support members, and an attenuation member between the first member and the second member.

13. The image pickup apparatus according to claim 12, wherein the first unit has fixing members that fix the first member, the second member, and the attenuation member to a base member.

14. The image pickup apparatus according to claim 13, wherein a distance between the predetermined rotation axis and the fixing members is shorter than distance between the predetermined rotation axis and the projection in a plane that intersects perpendicularly with the first direction.

* * * * *